(12) United States Patent
Coleman

(10) Patent No.: US 11,268,688 B2
(45) Date of Patent: Mar. 8, 2022

(54) ILLUMINATION APPARATUS

(71) Applicant: IceDog Limited, Surrey (GB)

(72) Inventor: Jason Coleman, Surrey (GB)

(73) Assignee: ICEDOG LIMITED, Surrey (GB)

(*) Notice: Subject to any disclaimer, the term of this patent is extended or adjusted under 35 U.S.C. 154(b) by 0 days.

(21) Appl. No.: 16/651,961

(22) PCT Filed: Sep. 19, 2018

(86) PCT No.: PCT/GB2018/052672
§ 371 (c)(1),
(2) Date: Mar. 27, 2020

(87) PCT Pub. No.: WO2019/063977
PCT Pub. Date: Apr. 4, 2019

(65) Prior Publication Data
US 2020/0256555 A1  Aug. 13, 2020

(30) Foreign Application Priority Data
Sep. 29, 2017 (GB) .................................. 1715866

(51) Int. Cl.
*F21V 33/00* (2006.01)
*A41D 13/01* (2006.01)
(Continued)

(52) U.S. Cl.
CPC .......... *F21V 33/0008* (2013.01); *A41D 13/01* (2013.01); *A42B 3/044* (2013.01);
(Continued)

(58) Field of Classification Search
CPC ....... F21V 33/0008; F21V 9/08; A41D 13/01; A42B 3/044; G02B 6/0006; G02B 6/001; G02B 6/0075
See application file for complete search history.

(56) References Cited

U.S. PATENT DOCUMENTS 5,245,516 A    9/1993  Haas et al.
5,502,903 A *  4/1996  Barker ................. A43B 1/0036
                                                    36/136
(Continued)

FOREIGN PATENT DOCUMENTS

CN    106820372 A    6/2017
EP    3073192 B1     6/2018
(Continued)

OTHER PUBLICATIONS

International Search Report, App. No. PCT/GB2018/052672, dated Jun. 12, 2018, 5 Pages.
(Continued)

*Primary Examiner* — Thomas M Sember
(74) *Attorney, Agent, or Firm* — Vorys, Sater, Seymour and Pease LLP

(57) ABSTRACT

A wearable illumination devices is provided, including a first light source coupled to a first light guide, a second light source coupled to a second light guide, and a support connected between the first and second light guides, wherein the first light source is configured to illuminate the first light guide and the second light source is configured to illuminate the second light guide.

19 Claims, 5 Drawing Sheets

(51) Int. Cl.
*A42B 3/04* (2006.01)
*F21V 9/08* (2018.01)
*F21V 8/00* (2006.01)
(52) U.S. Cl.
CPC ............... *F21V 9/08* (2013.01); *G02B 6/001* (2013.01); *G02B 6/0006* (2013.01); *G02B 6/0075* (2013.01)

(56) References Cited

U.S. PATENT DOCUMENTS

| | | |
|---|---|---|
| 5,879,076 A | 3/1999 | Cross |
| 2009/0027914 A1* | 1/2009 | Wu ................. G02B 6/001 362/555 |
| 2011/0289658 A1 | 12/2011 | Knoepfli et al. |
| 2014/0078773 A1 | 3/2014 | Curran et al. |
| 2016/0265760 A1 | 9/2016 | Dai et al. |

FOREIGN PATENT DOCUMENTS

| | | |
|---|---|---|
| GB | 2542845 A | 4/2017 |
| GB | 2566993 | 4/2019 |
| KR | 20120075690 A | 7/2012 |
| WO | 2005039338 A1 | 5/2005 |
| WO | 2017119849 A1 | 7/2017 |
| WO | 2019063977 A1 | 4/2019 |

OTHER PUBLICATIONS

Written Opinion of the International Searching Authority, App. No. PCT/GB2018/052672, dated Jun. 12, 2018, 6 Pages.

* cited by examiner

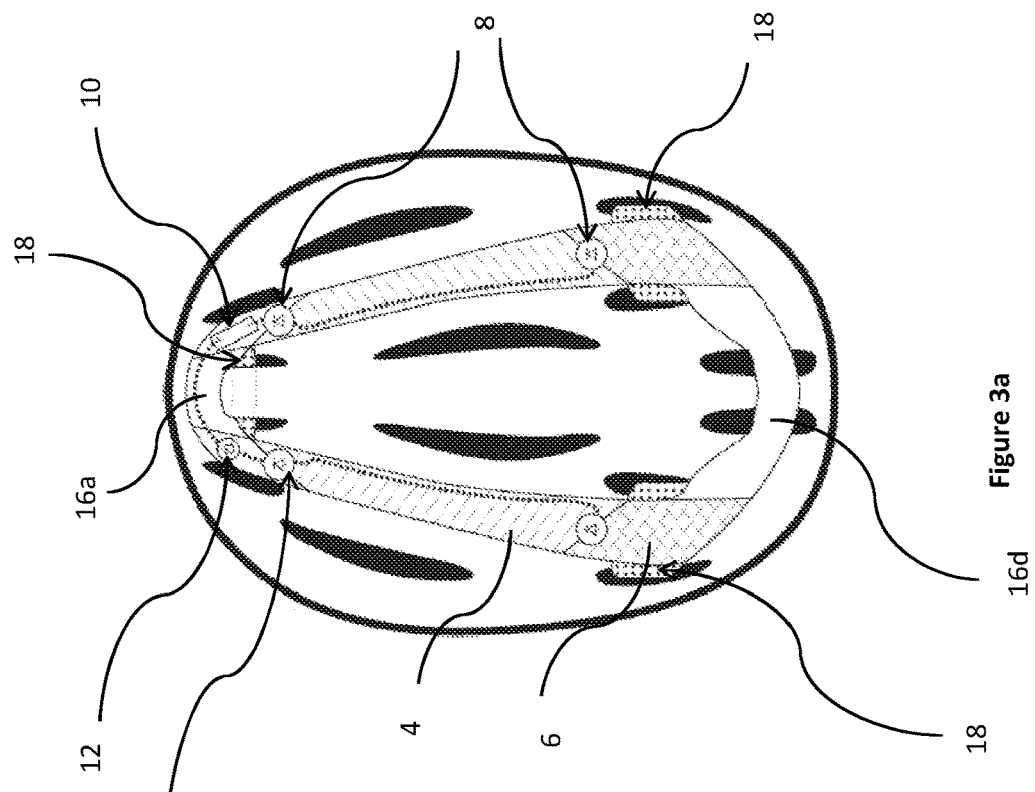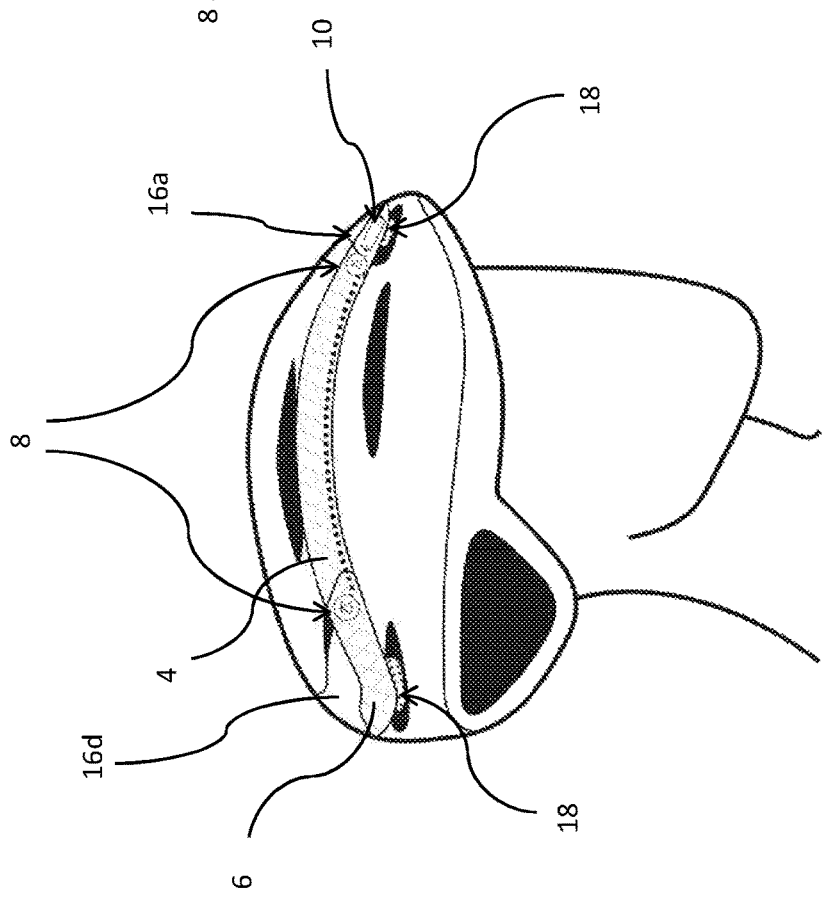

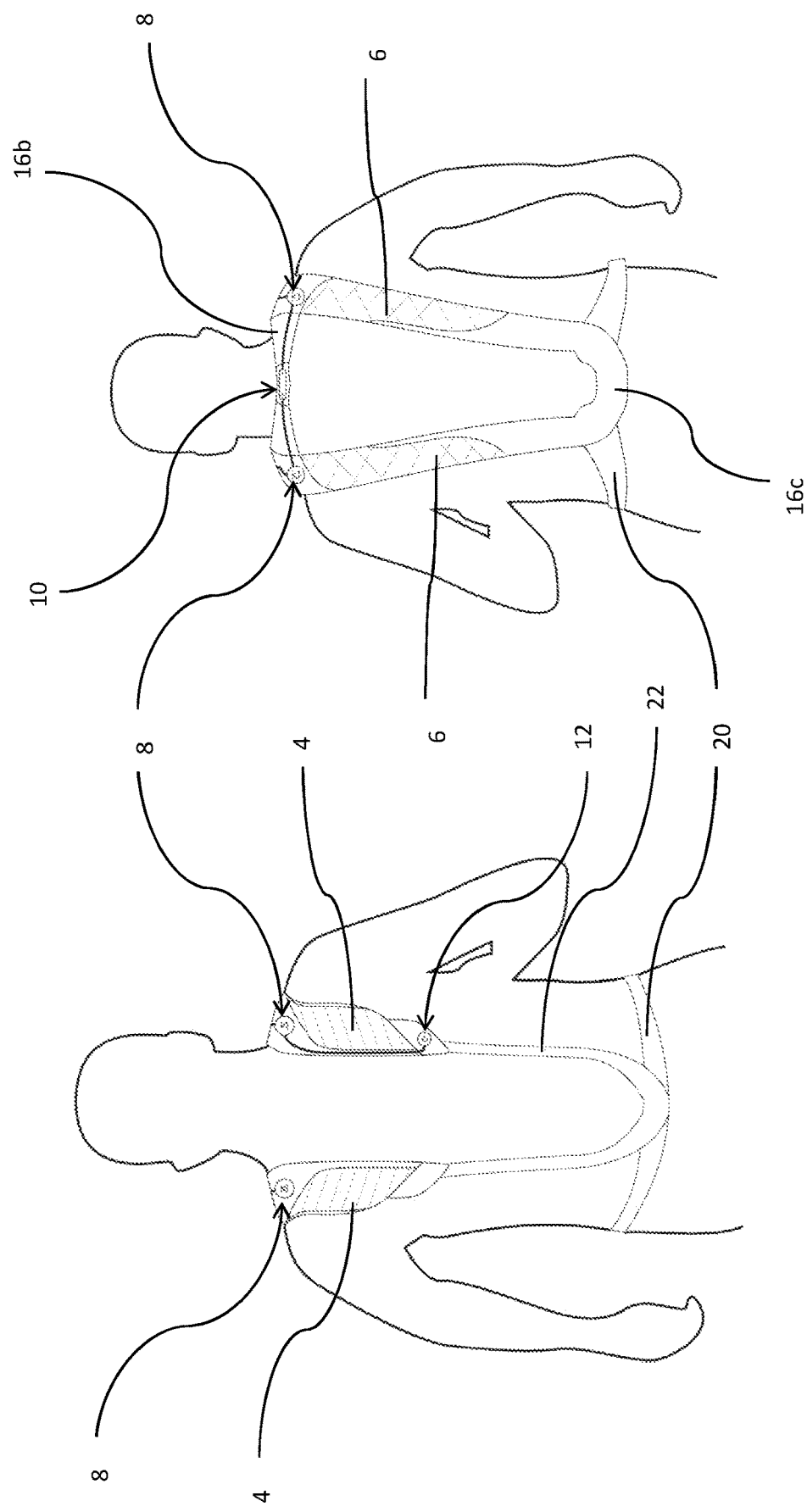

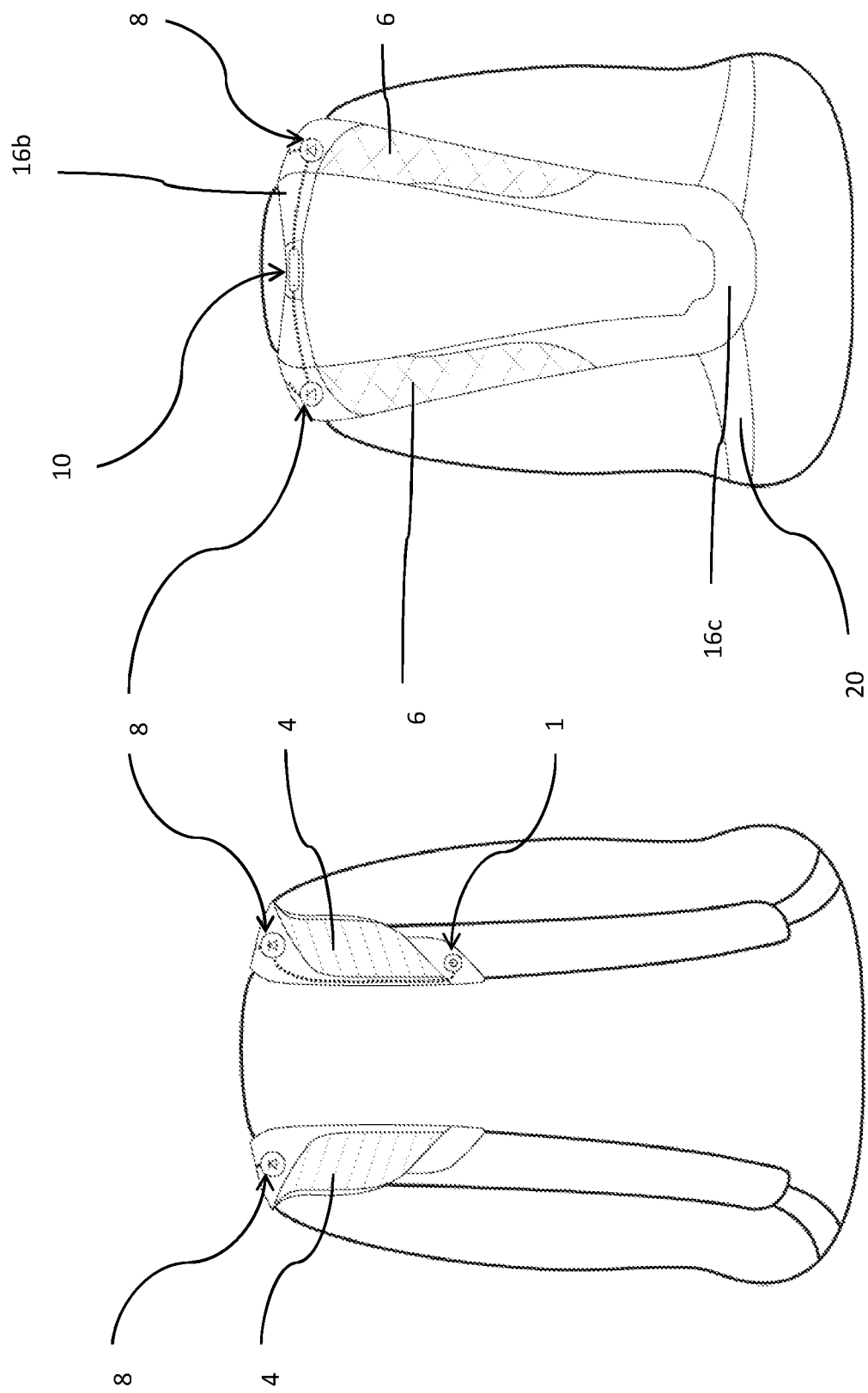

ILLUMINATION APPARATUS

This application is a National Phase of the International Application No. PCT/GB2018/052672 filed on Sep. 19, 2018, which is based on GB1715866.8 filed on Sep. 29, 2017, the disclosure of which is incorporated herein by reference in its entirety.

FIELD OF THE INVENTION

The present invention relates to wearable illumination devices, and particularly to wearable illumination devices that can be removably attached to a person and/or an accessory item wearable by a person.

BACKGROUND OF THE INVENTION

Wearable lighting devices for attachment to a user or a user accessory are known for a number of different purposes.

In particular, wearable lighting devices designed to be used for a plurality of different items are known. WO-A-2017119849 (Mas Innovation) concerns a silicone polymer or a polyurethane polymer composition used as a light guide affixed to a flexible and stretchable substrate. US-A-2016265760 (Ming D&Y) concerns a light transmitting device having a flexible elongated substantially flat band of light transmitting polymeric material, wherein an LED is mounted by a mounting structure immediately adjacent but not embedded in an end of the band, and wherein the band is intended to be incorporated in a container (e. g. backpack, fanny pack, clutch). However, these wearable lighting devices suffer from the distinct disadvantage that they emit only a single uniform colour of light regardless of their orientation, application or use.

Wearable lighting devices for attachment to bicycle helmets are known. CA-A-2643387 concerns an illuminator device that attaches to a safety helmet for providing illumination when a user is moving, wherein the illuminator device includes a light source coupled to fibre optic cables. However, the use of fibre optic cables is disadvantageous as they lack durability and robustness; factors which are especially important in the context of outdoor equipment such as helmets. Further, fibre optic cables emit only a single uniform colour of light regardless of their orientation, application or use, as defined by the colour of light input to them and/or any colouration of the cables.

Wearable lighting devices for attachment to a user, for instance in the form of a vest, are known. U.S. Pat. No. 9,410,694 (NoxGear) concerns an illuminated vest comprising an enclosure including a light-emitting diode and control electronics that control the light emitting diode, wherein a limb loop is created by an optical fibre structure that includes a first end and a second end and the light-emitting diode is optically coupled to the first end of the fibre optic structure, such that the optical fibre structure forms a structure for the vest. However, the use of fibre optic cables as the sole constituent structure of the vest is disadvantageously lacking in durability and is highly susceptible to breaking.

Hence, there is a desire in the art for wearable illumination devices of improved resilience and durability, and further a desire for wearable illumination devices that are configured to emit light in a plurality of colours, preferably indicating the orientation of the device when in use. Further still, there is a desire for wearable illumination devices specifically for use with backpacks.

STATEMENT OF THE INVENTION

Aspects of the invention are defined by the accompanying claims.

According to an aspect of the present invention, a wearable illumination device is provided that includes a first light guide and associated light source, and a second light guide and associated light source, as well as a support structure connecting the first light guide to the second light guide. Each light source is configured to illuminate its respective light guide. Advantageously, this provides a wearable illumination device of increased durability and resilience.

The light guides of the wearable illumination device may be provided with first and second sections, wherein each section may be configured to emit light of a different colour, such that each singular light guide is advantageously able to emit light of two different colours, and further to do so using only the single light source coupled to that light guide. Further advantageously, the wearable illumination device is therefore able to be configured to emit different coloured light in different directions, and/or to emit light in discrete directions instead of omni-directional light emission, thereby facilitating a discernible change in brightness and/or colour of emitted light when a third party passes from one side of the wearable illumination device to the other. This advantageously provides for increased visibility of the wearable illumination device.

The wearable illumination device may further comprise a separate second support in addition to the first support, such that the light guides of the wearable illumination device are connected together at two separate locations. This advantageously provides an increased structural integrity, resilience and durability to the wearable illumination device. Further, the double support structure configuration facilitates the secure application of the wearable illumination device to a number of different user accessories, such as backpacks or helmets, by providing a flexible and resilient support structure that can be attached to the user accessories or the user themselves at many different locations. Further still, the double support structure configuration facilitates the application to a user or user accessory by mutually corresponding to the contours of the structure it is being applied to. For instance, a first support may in use correspond to and rest on the shoulder of a user, or across the shoulder of a backpack, and the second support may structurally correspond to and interact with the contours of a user's back, or the outside of a backpack.

Depending on the application, the first support may connect the two ends of the light guides, and the second support may connect the other two ends of the light guides. Alternatively, the first support may connect two points between the ends of two light guides, and the second support may connect two ends of the two light guides. Advantageously, the location of the first support can be chosen to provide increased structural integrity depending on the application, and as an efficient location to house the power source of the light sources. Further still, the location of the supports is chosen per application to facilitate the directional orientation of the first sections of the light guides as opposed to the second sections of the light guides. In particular, the location of the first and second supports is chosen such that, when applied to the user or user accessory, the first sections may illuminated in at least a forward direction, and the second sections may illuminated in at least a backward direction.

BRIEF DESCRIPTION OF THE DRAWINGS

There now follows, by way of example only, a detailed description of preferred embodiments of the present invention, with reference to the figures identified below.

FIGS. 3a and 3b show an embodiment of the invention for attachment to a bicycle helmet. FIG. 3a shows a top-view of the embodiment when attached to a bicycle helmet. FIG. 3b shows a side-view of the embodiment when attached to a bicycle helmet.

FIGS. 4a and 4b show an embodiment of the invention for attachment to a user's person. FIG. 4a shows a front-view of the embodiment when attached to a user's person. FIG. 4b shows a back-view of the embodiment when attached to a user's person.

FIGS. 5a and 5b show an embodiment of the invention for attachment to a backpack. FIG. 5a shows a front-view of the embodiment when attached to a backpack. FIG. 5b shows a back-view of the embodiment when attached to a backpack.

DETAILED DESCRIPTION OF THE EMBODIMENTS

Figure 1:
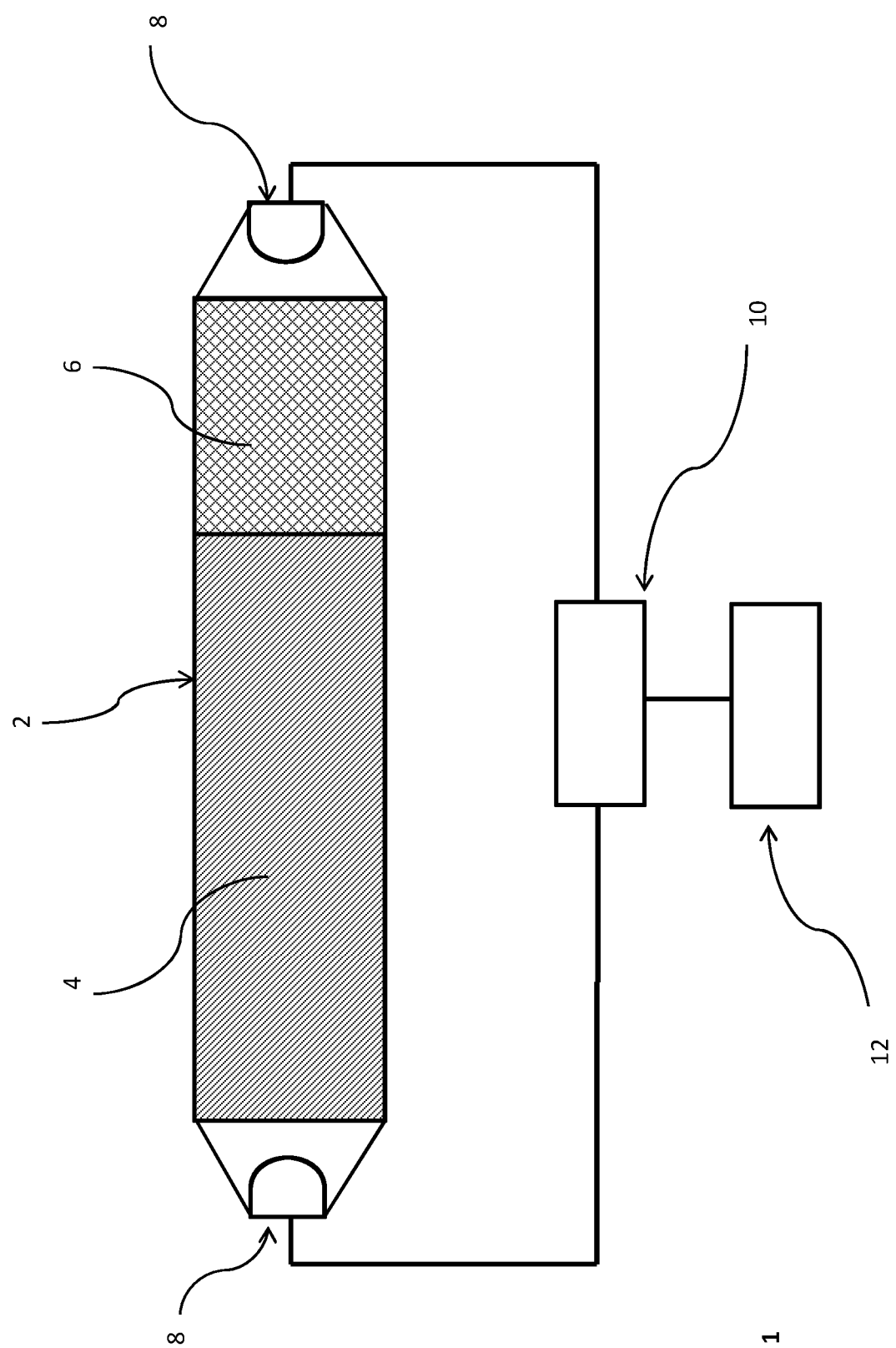
FIG. 1 shows a schematic diagram of a wearable light guide according to embodiments of the invention.

In the following description, functionally similar parts carry the same reference numerals between figures. Preferred embodiments of the invention are now described, by way of example only, with reference to the accompanying drawings.

FIG. 1 shows a schematic diagram of a wearable light guide 2. The wearable light guide 2 has a first section 4 and a second section 6. The wearable light guide 1 is coupled to at least one light source 8. The light source(s) 8 are connected to a power source 10 and control circuit 12.

The wearable light guide 2 is formed in an elongated shape, for instance in a substantially rectangular shape as shown in FIG. 1. The wearable light guide 2 is made of a material suitable for carrying and emitting light, and is configured to emit light substantially uniformly across its entire surface, and from each side. The surfaces of the wearable light guide 2 may for instance be roughened and/or translucent such that light is dispersed substantially uniformly from the surface of the wearable light guide 2, but also such that there is an amount of internal reflection along the length of the wearable light guide 2 to facilitate uniform illumination of the wearable light guide 2 along its entire length. The above described features are distinctly advantageous over, for instance, fibre optic illumination methods as the uniformity of the light emitted from the device is greatly increased across the entire extension of the device, and such that the bright spots characteristic of fibre optic configurations is avoided. The wearable light guide 2 is made of a flexible and resilient material, such as a hard resin or silicone, such that it is suitable for use outdoors and can withstand all weather conditions. The wearable light guide 2 is configured to be attached to and removed from a user or a user's accessory item. The means that facilitate this removable functionality are not shown in FIG. 1, and are described further below.

In use, the first section 4 of the wearable light guide 2 may be configured to emit light of the same colour as the second section 6 of the wearable light guide 2. Alternatively, the first section 4 may be configured to emit light of a different colour to the second section 6. As such, either the first section 4 or the second section 6 may comprise a coloured filter around the surface of the wearable light guide 2. Alternatively, both the first section 4 and the second section 6 may comprise different coloured filters around the surface of the wearable light guide 2. Alternatively, instead of the use of filters, the first section 4 and the second section 6 of the wearable light guide 2 may be formed of different coloured portions of the same material. In use, one of the sections may be configured to emit a white light, and the other one of the sections may be configured to emit a red light.

The light source(s) 8 may be provided at a location within the wearable light guide 2, either within the first section 4 or within the second section 6, or at the junction between the first section 4 and the second section 6. Alternatively, the light source(s) 8 may be coupled to an end of the wearable light guide 2. There may also be a plurality of light sources 8, wherein the light sources 8 are located at any one of the above combinations of locations. For instance, the wearable light guide 2 may have a light source 8 coupled to each end of the wearable light guide 2, or alternatively may have one light source 8 located somewhere within the wearable light guide 2 and one light source 8 coupled to an end of the wearable light guide 2, or alternatively may have both light sources 8 located somewhere within the wearable light guide 2. Regardless of their arrangement, in use the light source(s) 8 will substantially uniformly illuminate the entire wearable light guide 2, as described above, such that each surface of the wearable light guide 2 and each of the first section 4 and second section 6 emits light. Optionally, one of the surfaces of the wearable light guide 2 may be coated with a reflective layer, for instance such that in use the reflective layer is located on a surface closest to the user or the user's accessory, and is configured to reflect light away from the user or the user's accessory. Advantageously, the reflective layer prevents light from being wasted by being emitted into the user or the user's accessory, and thereby increases the illumination and brightness properties of the wearable light guide 2 by redirecting all light to be emitted from one of the other outward facing surfaces. An additional advantage of the reflective layer is that the wearable light guide 2 will also be able to reflect ambient light that enters the light guide from the outside, such that even when the light sources(s) 8 are not switched on, it will still function to an extent and therefore increase the visibility of the user or user's accessory to which it is attached by passively reflecting ambient light.

The light source(s) 8 may be any suitable light source, for instance Light Emitting Diodes (LEDs), Organic LEDs (OLEDs), Chip on Board (COB) LEDs, incandescent bulbs or fluorescent bulbs. Preferably, the light source(s) 8 are LEDs, as these are advantageously compact, robust, low-energy and high brightness.

The light source(s) 8 may be capable of continuous light emission, and/or may also be capable of strobe light emission. Other light emission modes could be included, as would be understood by the skilled person. The light source(s) 8 are connected to a power source 10 such that the light source(s) 8 can be supplied with electrical power. The power source 10 is any suitable power source as would be understood by the skilled person, and for instance may comprise a battery, a rechargeable battery and/or replaceable battery unit.

The light source(s) 8 are controlled by a control circuit 12 which may comprise a control switch for turning the light source(s) on and off, and which may further comprise a switch for changing between any different light emission modes. The control circuit 12 may further include wireless communication technology, such as Bluetooth™ technology, for communication with an external control device, for instance for control by an electronic software application running on a mobile device such as a mobile phone. The control circuit 12 may further comprise a sensor, such as an accelerometer or biometric sensor, a camera, and/or a digital memory unit.

Figure 2:
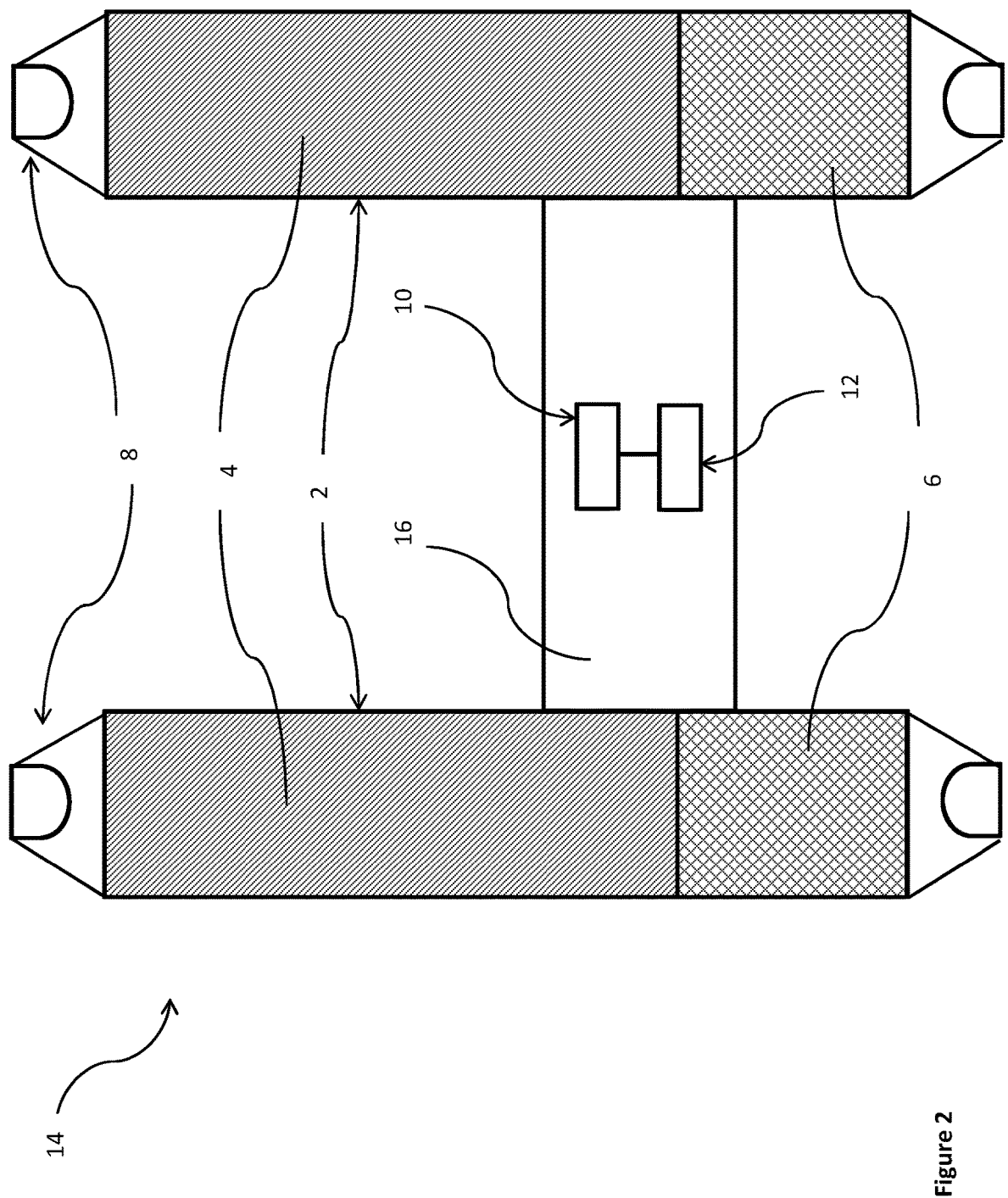
FIG. 2 shows a schematic diagram of a wearable light guide apparatus according to embodiments of the invention.

FIG. 2 shows a schematic diagram of a wearable light guide apparatus 14. The wearable light guide apparatus 14 comprises two wearable light guides 2, each of which is substantially the same as the wearable light guide 2 as shown in FIG. 1 and described above. The wearable light guide apparatus 14 has a support structure 16 which connects the light guides 2 together. The support structure may have mounted on or within it the power source 10 and the control circuit 12 as described above. The support structure 16 is shown schematically as approximately a third of the way along the wearable light guides 2, however it may be located anywhere between the two wearable light guides 2 and may for instance connect two ends of the wearable light guides 2 together. The support structure 16 may take any suitable shape, for instance curved or straight, and may further connect the wearable light guides 2 such that they are aligned substantially parallel to each other, or alternatively such that they are aligned in an orientation that is not parallel. Further, there may be more than one support structure 16 connecting the two wearable light guides 2 together. For instance, there may be a first support structure 16 connecting two ends of the wearable light guides 2 together, and there may be a second support structure 16 connecting the other two ends of the wearable light guides 2 together. As described above, each wearable light guide 2 may include a single light source 8, or a plurality of light sources 8, wherein the light sources 8 are located either within the respective wearable light guides 2 or are coupled to ends of the wearable light guides 2. The support structure 16 is made from a flexible and resilient material, such as any suitable plastic, such that in use when applied to a user or a user's accessory it can flex to accommodate the shape and contour of a range of different surfaces.

In use, the control circuit 12 is configured to control each of the light sources 8 of both wearable light guides 2, and may for instance control all of the light sources 8 simultaneously, and/or may be able to control each light source 8 individually in the manner described above. The wearable light guide apparatus 14 is configured to be attached to and removed from a user or a user's accessory item. The means that facilitate this removable functionality are not shown in FIG. 2, but may for instance be attached to the wearable light guides 2 and/or the support structure 16. These means are described further below.

FIGS. 3a and 3b show an embodiment of the present invention, in particular an embodiment of the wearable light guide apparatus 14 of FIG. 2 when attached to a bicycle helmet. In particular, the embodiment of FIGS. 3a and 3b show a wearable light guide apparatus having two support structures 16, with a first support structure 16a connecting one end of each wearable light guides 2 together, and a second support structure 16d connecting the other ends of the wearable light guides 2 together. In particular, one of the support structures 16a is shown to be shorter than the other, and hence the overall shape of the wearable light guide apparatus 14 of the present embodiment is shown to be such that the wearable light guides 2 are not parallel to each other, but are instead angled, such that the wearable light guide apparatus 14 may for instance be described as approximately triangular in as viewed from above. Advantageously, this configuration allows for improved attachment to the bicycle helmet as the wearable light guide apparatus can flex to fit tightly and neatly with the contours of the bicycle helmet. Further advantageously, as can clearly be seen by the combination of FIGS. 3a and 3b, the approximately triangular formation of the present embodiment provides a elongate profile to the first section 4 when applied to the helmet, such that in use the first section 4 will illuminate brightly in both the forward direction, and also the outwardly in the sideways direction defined relative to the helmet. Indeed, the wearable light guide apparatus 14 of the present embodiment can be seen to extend substantially across the entire helmet from front to back, or vice versa, whilst also extending partially around the sides of the helmet. This distinctly advantageous configuration allows the wearable light guide apparatus 14 to most effectively and efficiently provide illumination in all directions, including forwards, backwards and sideways relative to the helmet. In use, this configuration allows the wearable light guide apparatus 14 to be seen from all directions. In particular, even when the first sections 4 and the second sections 6 are configured to emit the same coloured light, there is advantageously distinct directional emission of light in the forward, backward, and sideways directions.

Further, the approximately triangular shape provides at least three suitable locations for attachment means to connect the wearable light guide apparatus 14 to the helmet, the locations being approximately in the location of the vertices of the triangular profile, thereby improving the security of the attachment. The wearable light guide apparatus 14 may further comprise support bands (not shown here) which are located underneath the light guides 2 and extend along the length of the light guides 2 from one support structure 16 to another to provide increased structural resilience to the wearable light guide apparatus 14, and thereby advantageously improving the strength of the wearable light guide apparatus 14 as the light guides 2 are not relied on to provide the sole structural integrity of the device.

In use, the wearable light guide apparatus 14 may be removably attached to a bicycle helmet as shown. In particular, the wearable light guide apparatus may include attachment means 18 configured to secure the wearable light guide apparatus to the bicycle helmet. The attachment means 18 may for instance include straps including buckles, clips or Velcro™, such that the strap may be wrapped around a feature of the helmet, such as a part between ventilation slots, and may be secured thereto. The attachment means 18 may comprise any other suitable form of attachment as would be understood by the skilled person, for instance where straps are inappropriate, the attachment means 18 may comprise mutual Velcro™ pads attached to the helmet and the wearable light guide apparatus 14 respectively. The attachment means 18 advantageously provide a quick and efficient means of removably attaching the wearable light guide apparatus 14 to the helmet.

The wearable light guide apparatus may be configured such that when attached to the bicycle helmet, the first sections 4 substantially emit light in the sideways and forwards directions with respect to the helmet, and the second sections 6 substantially illuminate in the sideways and backwards directions with respect to the helmet, as shown in FIG. 3b. As can be seen, the advantageously tight fitting of the wearable light guide apparatus to the helmet, as provided by the attachment means 18 in combination with the flexible light guides 2 and the flexible support structures 16a and 16d in combination with the approximately triangular shape of the wearable light guide apparatus 14, further advantageously provides a wide angular spread of illumination directions as the wearable light guides 2 follows the contours of the helmet from the front to the back of the helmet. As each wearable light guide 2 is configured to illuminate from at least each of the exposed surfaces of the wearable light guides 2, illumination is advantageously directed in at least forward, sideward and backward directions with respect to the helmet. Hence, in use, the wearable light guide apparatus will provide illumination in both the direction of travel of the user, i.e. forward with respect to the helmet, behind the user and to the side of the user, thus advantageously improving the safety of the user of the helmet by providing illumination in all pertinent directions that may be seen by third parties.

The relative size of the first section 4 may be larger than the size of the second section 6, such that the illumination from the second section, for instance configured as a red light, is substantially only viewable from the rear of the user. However, different relative sizes of the first section 4 and second section 6 are also envisaged. The illumination in the direction of travel, a result provided by the above described shape and configuration of the wearable light guide apparatus that facilitates tight contour fitting across the length of the helmet, advantageously also provides illumination of the path ahead for the user. The first sections 4 may be configured to emit the same coloured light, for instance white light, and the second sections 6 may be configured to emit the same coloured light as each other but of a different colour from the first sections 4, for instance red light. Alternatively, all of the first section 4 and second sections 6 may be configured to emit light of the same colour.

In some configurations, when attached to the bicycle helmet, the wearable light guide apparatus may be configured to fit within the ventilation shafts of the helmet such that a highly streamlined and integrated attachment to the helmet can be achieved, thereby advantageously reducing the bulk of helmet with the wearable light guide apparatus attached and providing a low profile configuration. The control circuit 12 may be located on the support structure 16 such that when in use it is located at the front of the helmet, thereby advantageously allowing the user easy and efficient access to the controls even when the helmet is on the user's head.

FIGS. 4a and 4b show an embodiment of the present invention, in particular an embodiment of the wearable light guide apparatus 14 of FIG. 2 when attached to a user's torso. In particular, the embodiment of FIGS. 4a and 4b show a wearable light guide apparatus having two support structure 16 connections between the two wearable light guides 2. A support structure 16b is located approximately in the middle section of the two wearable light guides 2 and connects two approximately central sections of the two wearable light guides 2 together, and a support structure 16c is located at the other end of the wearable light guide apparatus 14 connecting an end of the wearable light guides 2 together. Advantageously, in use this multi-branched support structure 16 provides increased strength and resilient integrity to the device, making it sturdy and less likely to break. Further advantageously, the provision of a dedicated support structure 16 providing structural integrity is far stronger than prior art configurations which rely on, for instance, fibre optic cables to simultaneously provide illumination and structural support.

In use, the wearable light guide apparatus 14 is dimensioned such that the support structure 16b will rest upon the shoulders of a user, and the support structure 16c will be located at a point around the torso of a user on the user's back. The power source 10 may be located in the support structure 16b located approximately in the middle section of the two wearable light guides 2, such that it is advantageously located at a position where its movement in use is minimal compared to the other support structure 16c, thereby providing increased integrity to the system that reduces the likelihood of the electrical system failing under tensile or torsional stresses. As with previous embodiments, the power source 10 may be removable and may comprise standard batteries, or may comprise rechargeable batteries. The control unit 12 is as described in previous embodiments, however is advantageously located on the front side of the wearable light guide apparatus 14 when in use, such that the user can have easy and efficient access to the control system whilst using the product. This advantageously allows the user to switch between different illumination settings of the wearable light guide apparatus 14 dynamically in response to real time events occurring in use.

The structural configuration of the wearable light guide apparatus 14 provides an advantageously distinct directional emission of light in the forward direction and the backward direction, such that even when the first sections 4 and the second sections 6 are configured to emit the same coloured light, there is a distinct brightness differential in visible light emission as perceived by third parties as they pass from front to back, or vice versa, of the device. In particular, there is a visibly bright illumination as seen from the front, a less bright illumination when seen from the side, and a return to bright illumination when seen from the front. Advantageously, this differential in lighting, as produced by all embodiments of the present invention, increases the likelihood of a third party perceiving the wearable light guide apparatus 14 in use, hence increasing the visibility of the wearable light guide apparatus 14.

As described above, the first section 4 may produce illumination of a different colour from the second section 6. For instance, the first section 4 may emit white light and the second section 6 may emit red light, such that an orientation of the user may be discerned by third parties, and such that a differential in lighting is noticed by third parties as they pass from one side of the wearable light guide apparatus 14 to the other. Advantageously, this differential in lighting, as produced by all embodiments of the present invention, increases the likelihood of a third party perceiving the wearable light guide apparatus 14 in use, hence increasing the visibility of the wearable light guide apparatus 14. The wearable light guide apparatus 14 of the present embodiment is designed such that in use it emits light substantially only in a forward and rearward directions with respect to the user. As described above, this is doubly advantageous over the prior art which discloses systems which emit light in all directions, and which emit only a single colour of light. In the present embodiment, both these limitations are overcome by firstly providing a configuration that configured to emit light substantially only forward and backward with respect to the user, and secondly providing for a different coloured light emission from each section, such that synergistically there is a highly discernible differential in lighting perceivable to third parties as they pass the wearable light guide apparatus 14 from front to back, or vice versa.

Each support structure 16 may include an attachment means (not shown here) for attaching the wearable light guide apparatus 14 to the user in use. The multiple points of attachment advantageously allow a more secure attachment of the wearable light guide apparatus 14 to a user, and further allow for a wide range of adjustments and the dimensional flexibility to accommodate a wide variety of user body profiles. In particular, the support structure 16c may comprise an attachment means for attaching to a belt 20 to be used with the wearable light guide apparatus 14 that can be placed around the waist of a user. For instance, the attachment means may comprise a clip or buckle that can be securely attached to mutual fittings on the belt 20. Further, an attachment means may be located under the first sections 4, such as for instance a harness or strap, for securely attaching the wearable light guide apparatus 14 to a separate harness 22 attached to the belt 20.

Further, as described above, the wearable light guide apparatus 14 may further comprise support bands (not shown here) which are located underneath the light guides 2 and extend along at least part of the length of each of the light guides 2 to provide increased structural resilience to the wearable light guide apparatus 14, and thereby advantageously improving the strength of the wearable light guide apparatus 14 as the light guides 2 are not relied on to provide the sole structural integrity of the device.

FIGS. 5a and 5b show an embodiment of the present invention, in particular an embodiment of the wearable light guide apparatus 14 of FIG. 2 when attached to a backpack. The wearable light guide apparatus 14 of FIGS. 5a and 5b is a variation of the embodiment of FIGS. 4a and 4b, and hence the description and embodiments of the embodiment of FIGS. 4a and 4b is largely applicable here, and the advantages described there apply to this embodiment also. The distinction between the two embodiments of FIGS. 4 and 5 is primarily in the means of attachment. In the present embodiment, there is a support section 16b connecting the wearable light guide 2 located approximately in the middle section between the two wearable light guides 2, and a support section 16c located toward the back of the wearable light guide apparatus 14 when in use. The wearable light guide apparatus 14 of the present embodiment includes attachment means (not shown here) for attaching the wearable light guide apparatus 14 to a backpack. The attachment means may for instance be located on the support structure 16c, and may comprise a buckle or clip, configured to be attached to mutual attachment means located on a belt 20 to be placed around the backpack when in use. Further attachment means may be located under the first section 4 and may comprise harnesses or straps for securing the wearable light guide apparatus 14 to a conventional backpack.

In use, the wearable light guide apparatus 14 is dimensioned such that the support structure 16b will rest upon the shoulder section of a user's backpack, and the support structure 16c will be located at a point around the bottom of the user's backpack. The power source 10 may be located in the support structure 16b located approximately in the middle section of the two wearable light guides 2, such that it is advantageously located at a position where its movement in use is minimal compared to the other support structure 16c, thereby providing increased integrity to the system that reduces the likelihood of the electrical system failing under for instance tensile or torsional stresses. As with previous embodiments, the power source 10 may be removable and may comprise standard batteries, or may comprise rechargeable batteries, and/or may comprise a removable battery unit. The control unit 12 is as described in previous embodiments, and is advantageously located on the front side of the wearable light guide apparatus 14 when in use, such that the user can have easy and efficient access to the control system whilst using the product. As described above, the first section 4 may produce illumination of a different colour from the second section 6. For instance, the first section 4 may emit white light and the second section 6 may emit red light.

Further, as described above, the wearable light guide apparatus 14 may further comprise support bands (not shown here) which are located underneath the light guides 2 and extend along at least part of the length of each of the light guides 2 to provide increased structural resilience to the wearable light guide apparatus 14, and thereby advantageously improving the strength of the wearable light guide apparatus 14 as the light guides 2 are not relied on to provide the sole structural integrity of the device.

The configuration of the present embodiment is designed such that, as with the embodiment of FIGS. 4a and 4b, there is a discernible differential in lighting perceivable to third parties when passing from the front to back, or vice versa, of the wearable light guide apparatus 14 when in use. This advantage is provided by the configuration of the wearable light guide apparatus 14 that provides separation of the first section 4 and the second section 6 when the wearable light guide apparatus 14 is applied to the backpack and is in use. As with the embodiment of FIGS. 4 and 4b, the configuration provides for substantially distinct forward illumination from the first section 4 and rearward illumination from the second section 6, hence provided the associated advantageous lighting differential as described above. As described above, this advantage applies in terms of a brightness differential when the first sections 4 and second sections 6 are configured to produce the same coloured light, and the advantage applies in terms of a brightness and colour differential when the first sections 4 are configured to emit light of a different colour to the second sections 6.

Alternative Embodiments

The embodiment described above is illustrative of, rather than limiting to, the present invention. Alternative embodiments apparent on reading the above description may nevertheless fall within the scope of the invention.

The invention claimed is:

1. A wearable illumination device for removable attachment to a user accessory, comprising:
a first light source within a first light guide and configured to illuminate the first light guide;
a second light source within a second light guide and configured to illuminate the second light guide; and
a support connected between a first end of the first light guide and a proximate first end of the second light guide, providing structural integrity to the wearable illumination device and comprising means for removably attaching the wearable illumination device to a user accessory; wherein the first light guide comprises first and second sections, and the second light guide comprises first and second sections, wherein the first section of the first light guide is configured to emit light of a different colour from the second section of the first light guide, and the first section of the second light guide is configured to emit light of a different colour from the second section of the second light guide.

2. The wearable illumination device of claim 1, wherein the support is a first support, and further comprising a second support discrete from the first support and connected between the first and second light guides.

3. The wearable illumination device of claim 2, wherein the second support connects a second end of the first light guide to a proximate second end of the second light guide.

4. The wearable illumination device of claim 3, wherein the first and second supports are dimensioned such that the linear separation between the first ends of the light guides is smaller than the linear separation between the second ends of the light guides.

5. The wearable illumination device of claim 1, wherein the user accessory is a helmet and the means for removably attaching the wearable illumination device to the user accessory comprises an attachment configured to removably attach the wearable illumination device to a helmet, and wherein the wearable illumination device is configured to be removably attachable to a helmet such that the first support is at the back of the helmet and the second support is at the front of the helmet.

6. The wearable illumination device of claim 5, wherein the attachment is a first attachment, and further comprising a second and third attachment configured to removably attach the wearable illumination device to a helmet, wherein the first attachment is located on the first support, and the second attachment is located near the second end of the first light guide, and the third attachment is located near the second end of the second light guide.

7. The wearable illumination device of claim 1, wherein the first sections are configured to emit light in the forward and sideward directions, and the second sections are configured to emit light in the backward direction.

8. The wearable illumination device of claim 1, further comprising a control circuit on the first support configured to control the operation of the light sources.

9. The wearable illumination device of claim 2, wherein the first light guide has a second end, wherein the second light guide has a second end, wherein the first support connects to the first light guide at a location between the first and second ends of the first light guide, and wherein the first support connects to the second light guide at a location between the first and second ends of the second light guide, and the second support connects a second end of the first light guide to a proximate second end of the second light guide.

10. The wearable illumination device of claim 9, wherein the means for removably attaching the wearable illumination device to the user accessory comprises an attachment configured to removably attach the wearable illumination device to a user, wherein the wearable illumination device is configured to be removably attachable to a user such that the first support is located near the shoulder of the user, and the second support is located on the back of the user.

11. The wearable illumination device of claim 10, wherein the attachment is a first attachment, and further comprising a second and third attachments, wherein the first attachment is located on the second support, the second attachment is located near the first end of the first light guide, and the third attachment is located near the first end of the second light guide, and wherein the first attachment comprises a clip configured to attach to a belt around the user's torso, and the second and third attachments are configured to attach to a harness on the user's torso.

12. The wearable illumination device of claim 9, wherein the user accessory is a backpack and the means for removably attaching the wearable illumination device to the user accessory comprises an attachment configured to removably attach the wearable illumination device to a backpack, wherein the wearable illumination device is configured to be removably attachable to a backpack such that the first support is located near the shoulder of the user, and the second support located on the back of the backpack.

13. The wearable illumination device of claim 12, wherein the attachment is a first attachment, and further comprising a second and third attachments, wherein the first attachment is located on the second support, the second attachment is located near the first end of the first light guide, and the third attachment is located near the first end of the second light guide, and wherein the first attachment comprises a clip configured to attach to a belt around the bottom of the backpack, and the second and third attachments are configured to attach to the front straps of a backpack.

14. The wearable illumination device of claim 1, wherein the first section of the first light guide and the first section of the second light guide are configured to emit the same coloured light, and wherein the second section of the first light guide and the second section of the second light guide are configured to emit the same coloured light, and wherein the first sections are configured to substantially emit light in a first direction, and the second sections are configured to substantially emit light in a second direction, wherein the first and second directions are different.

15. The wearable illumination device of claim 1, further comprising a power source located in one of the supports configured to power the light sources.

16. The wearable illumination device of claim 1, wherein at least one of the sections comprises a colour filter.

17. The wearable illumination device of claim 1, wherein the first light guide has a second end, wherein the second light guide has a second end, and wherein the first light source is located at one of the first or second ends of the light guide, and wherein the second light source is located at one of the first or second ends of the second light guide.

18. The wearable illumination device claim 1, wherein the first light guide has a second end, wherein the second light guide has a second end, and wherein the first light source is located at a location between the first and second ends of the first light guide, and wherein the second light source is located at a location between the first and second ends of the second light guide.

19. The wearable illumination device of claim 1, wherein the light guides and the support are made of a flexible material, and wherein the support is configured to substantially relieve the light guides of tensile and torsional stress.

* * * * *